United States Patent
Mansour et al.

(10) Patent No.: US 11,899,119 B2
(45) Date of Patent: Feb. 13, 2024

(54) METHOD FOR PROCESSING GPS ROUTE DATA OF A VEHICLE

(71) Applicant: ZF Friedrichshafen AG, Friedrichshafen (DE)

(72) Inventors: Rachid Mansour, Markdorf (DE); Robert Gronner, Friedrichshafen (DE); Thomas Ascher, Amtzell (DE); Freddy Josef Frombach, Eriskirch (DE); Maik Würthner, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/642,832

(22) PCT Filed: Oct. 2, 2020

(86) PCT No.: PCT/EP2020/077622
§ 371 (c)(1),
(2) Date: Mar. 14, 2022

(87) PCT Pub. No.: WO2021/069317
PCT Pub. Date: Apr. 15, 2021

(65) Prior Publication Data
US 2022/0381925 A1 Dec. 1, 2022

(30) Foreign Application Priority Data
Oct. 11, 2019 (DE) ............ 10 2019 215 677.0

(51) Int. Cl.
*G01S 19/42* (2010.01)
*G01S 19/40* (2010.01)
(Continued)

(52) U.S. Cl.
CPC ............ *G01S 19/42* (2013.01); *G01S 19/40* (2013.01); *G01S 19/03* (2013.01); *G01S 19/07* (2013.01); *G01S 19/48* (2013.01)

(58) Field of Classification Search
CPC .......... G01S 19/42; G01S 19/40; G01S 19/48; G01S 19/03; G01S 19/07
(Continued)

(56) References Cited

U.S. PATENT DOCUMENTS 6,356,837 B1 * 3/2002 Yokota .................. G01C 21/34
701/461
6,453,235 B1 9/2002 Endo et al.
(Continued)

FOREIGN PATENT DOCUMENTS

DE 10 2004 016 745 A1 10/2004
DE 10 2010 028 671 A1 11/2011
(Continued)

OTHER PUBLICATIONS

European Patent Office, International Search Report issued for PCT Application No. PCT/EP2020/077622 (dated Feb. 16, 2021).
(Continued)

*Primary Examiner* — Chuong P Nguyen
(74) *Attorney, Agent, or Firm* — Finch & Maloney PLLC

(57) ABSTRACT

A method for processing GPS route data of a vehicle is proposed, in which the GPS route data are used for the route guidance of the vehicle along a route (1), wherein vehicle positions and an offroad position information or an onroad position information are generated as route data, wherein a vehicle position calculation function for route guidance of the vehicle is used, if erroneous vehicle positions are generated from the GPS route data. Furthermore, a control device for carrying out a method is proposed.

17 Claims, 2 Drawing Sheets

(51) Int. Cl.
  *G01S 19/03* (2010.01)
  *G01S 19/07* (2010.01)
  *G01S 19/48* (2010.01)
(58) Field of Classification Search
  USPC .............. 342/357.25, 357.23, 357.31, 357.4,
  342/357.44
  See application file for complete search history.

(56) References Cited

U.S. PATENT DOCUMENTS

| | | | |
|---|---|---|---|
| 7,346,450 B2 | 3/2008 | Usui | |
| 7,653,482 B2 * | 1/2010 | Sumizawa | G01C 21/30 701/448 |
| 8,498,813 B2 | 7/2013 | Oohashi et al. | |
| 9,234,760 B2 * | 1/2016 | DeLuca | G01S 19/49 |
| 10,254,414 B2 * | 4/2019 | McFarland | G01S 19/51 |
| 10,655,973 B2 * | 5/2020 | Khasis | G01C 21/3415 |
| 2006/0293843 A1 * | 12/2006 | Morita | G01C 21/30 701/442 |
| 2011/0208424 A1 | 8/2011 | Hirsch et al. | |
| 2011/0313648 A1 | 12/2011 | Newson et al. | |
| 2017/0299393 A1 * | 10/2017 | Steinhardt | G01C 21/1654 |
| 2018/0292543 A1 | 10/2018 | McFarland et al. | |

FOREIGN PATENT DOCUMENTS

| | | | | |
|---|---|---|---|---|
| DE | 102013224769 A1 * | 6/2015 | ......... | G01C 21/3617 |
| EP | 1674826 A1 * | 6/2006 | ............. | G01C 21/30 |
| WO | 2011/138098 A1 | 11/2011 | | |

OTHER PUBLICATIONS

European Patent Office, Written Opinion issued for PCT Application No. PCT/EP2020/077622 (dated Feb. 16, 2021) (English Translation of NPL document cited previously in IDS filed Mar. 14, 2022).

German Patent Office, German Search Report issued in German Patent Application No. 10 2019 215 677.0 (dated Sep. 17, 2020) (English Translation of NPL document cited previously in IDS filed Mar. 14, 2022).

* cited by examiner

METHOD FOR PROCESSING GPS ROUTE DATA OF A VEHICLE

RELATED APPLICATIONS

This application claims the benefit under 35 U.S.C. § 371 as a U.S. National application of application no. PCT/EP2020/077622, filed on 2 Oct. 2020, which claims the benefit of German Patent Application no. 10 2019 215 677.0, filed 11 Oct. 2019, the contents of which are incorporated herein by reference in their entireties.

FIELD OF THE DISCLOSURE

The present invention relates to a method for processing GPS route data of a vehicle of the type defined in greater detail in the claims. Furthermore, the invention relates to a control device for carrying out the method.

BACKGROUND

A method for operating a powertrain is known, for example, from publication DE 10 2010 028 671 A1. In the method, an engine control device is used in order to control the powertrain, wherein data is provided by a navigation system regarding a route lying ahead of the motor vehicle, and wherein the transmission control device automatically triggers shifts in the transmission as a function of the data provided by the navigation system and/or automatic parameter sets are executed, adjusted or selected on the basis of those in the transmission. Thus, shifting operations are adjusted accordingly with the help of data from the navigation system.

Furthermore, it is known that errors in the processing of GPS route data can occur due to erroneous signals from a GPS receiver and thus result in erroneous vehicle route guidance.

SUMMARY

The underlying problem of the present invention is to propose a method of the genus described above as well as a control device for carrying out the method, which improves vehicle route guidance.

According to the invention, this problem is solved by the features of claims 1 and 10, respectively. Advantageous and claimed further developments result from the sub-claims and the description as well as from the drawings.

Thus, the method is proposed for processing GPS route data of a vehicle in which the GPS route data is used for vehicle route guidance, wherein vehicle positions and an offroad position information or an onroad position information are generated as route data.

In order to further optimize the vehicle route guidance, it is provided that a vehicle position calculation function is used for vehicle route guidance when erroneous vehicle positions are generated or detected from the GPS route data.

In this way, it is possible with the proposed method to replace erroneous or implausible GPS route data with pre-calculated vehicle positions of a vehicle position calculation function and thus to significantly improve the vehicle route guidance. Accordingly, in the event of erroneous vehicle positions from the GPS route data, the vehicle position calculation function uses pre-calculated vehicle positions for vehicle route guidance.

For example, the vehicle position calculation function can pre-calculate corresponding vehicle positions for vehicle route guidance using speed signals of the vehicle. These internally calculated vehicle positions are used as replacement values for the position from the GPS route data, because the GPS position signal is erroneous or invalid. Other signals of the vehicle can also be used in order to pre-calculate vehicle positions.

The calculation of vehicle positions by the vehicle position calculation function can be bound to certain prerequisites. As a possible prerequisite, for example, during the calculation of vehicle positions by the vehicle position calculation function, an offroad route traveled by the vehicle could be used. For example, when a predetermined threshold of the offroad route traveled is reached, the vehicle position calculation function can be deactivated, and the pre-calculation or vehicle route guidance with these pre-calculated vehicle positions can be terminated. In this way, a virtual vehicle position reset can occur, and the originally used or currently valid GPS route data can be reused in order to further carry out a vehicle route guidance.

In principle, and as part of the proposed method, it is monitored whether an onroad position information or an offroad position information occurs. Thus, for example, if the vehicle position calculation function is already activated while in standby mode, the vehicle route guidance can be adopted by correspondingly pre-calculated vehicle positions when an offroad position information is detected.

An offroad position information means that, according to the detected GPS route data, the vehicle is outside of roads and thus there is an erroneous signal onroad or road signal. When an onroad position information is present, the vehicle is on a road, so that the GPS route data can be used for vehicle route guidance.

A further aspect of the present invention relates to the claim of a control device for carrying out the above-described method.

BRIEF DESCRIPTION OF THE DRAWINGS

The present invention will be further described below on the basis of the drawings. The following are shown.

DETAILED DESCRIPTION

Figure 1:
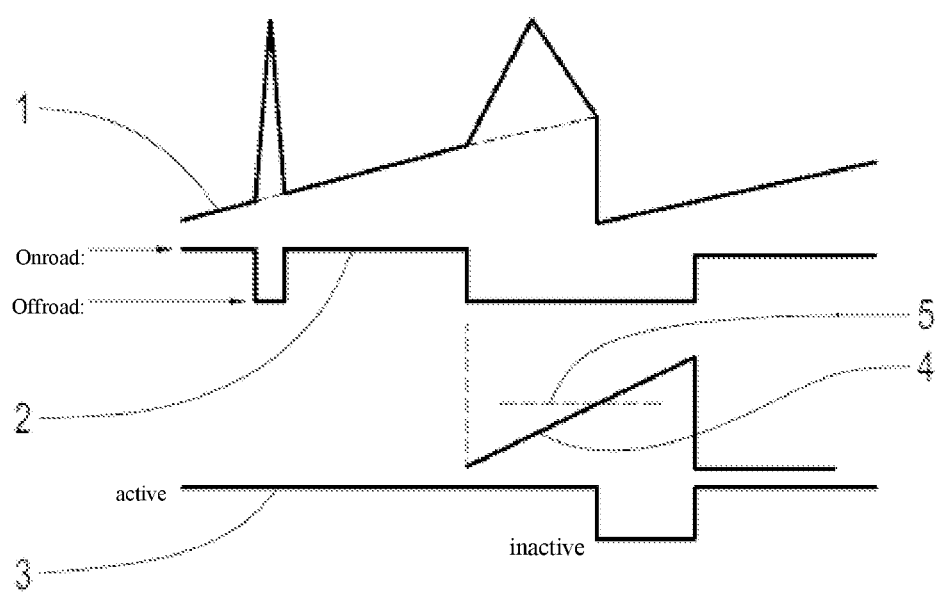
FIG. 1: a schematic view of a profile of a route for vehicle route guidance, a profile of onroad and offroad position information, a profile of activating and deactivating a vehicle position calculation function, and a profile of an offroad route traveled.

FIG. 1 shows a profile 1 of a route consisting of the individual vehicle positions in the upper part of the illustration. Below the shown profile 1 of the route, profile 2 of offroad and onroad activations by the detection of offroad and onroad position information is shown. This means that the vehicle is on the road when the onroad position information is detected, whereas the vehicle is outside of a road when the offroad position information is detected.

Below profile 2, a further profile 3 is shown, which represents the activated and unactivated or deactivated state of a vehicle position calculation function.

Between profile 2 of the onroad and offroad activations and profile 3 regarding the activation and deactivation of the vehicle position calculation function, a profile 4 of a route traveled offroad is shown. The route traveled offroad begins with the change from onroad to offroad and is delimited by a predetermined threshold 5 of the route traveled offroad.

As can be seen from profile 1 along the route, GPS route data for the vehicle route guidance are first used for as long as the vehicle is onroad. It can be seen from profile 2 that, after a predetermined period of time of the vehicle route guidance on the basis of the erroneous GPS route data, an offroad state occurs, which can be detected by an offroad position information and can be seen from profile 2.

At this time, there are erroneous vehicle positions from the erroneous GPS route data, which is illustrated by a sharp incline in profile 1. These erroneous vehicle positions cannot be used for further vehicle route guidance. Therefore, vehicle positions pre-calculated by the vehicle position calculation function are used for vehicle route guidance when such erroneous vehicle positions are generated from the GPS route data.

As part of the vehicle position calculation function, internally pre-calculated vehicle positions from a speed signal are used as a replacement signal for the vehicle position of the GPS signal. Accordingly, the route is pre-calculated, which is represented by a dashed line for profile 1. As soon as an onroad position information is detected, which is illustrated in profile 2, no erroneous vehicle positions are generated from the GPS route data, so that these vehicle positions are used for further vehicle route guidance. Accordingly, a solid line is again seen in profile 1.

After a certain period of time of the vehicle route guidance, a significant incline is again seen in profile 1, which is caused by the fact that the vehicle is offroad in profile 2. Accordingly, the GPS data cannot be further used. As a result, a dashed line is seen again in profile 1, which indicates that the vehicle positions for the vehicle route guidance are determined or pre-calculated by the calculation function.

Within the scope of the method, it is provided that the length or duration of the offroad route traveled by the vehicle is detected. When a predetermined threshold 5 of the offroad route traveled is reached, the vehicle position calculation function is deactivated, as illustrated in profile 3. When the vehicle position calculation function is deactivated, a vehicle position reset occurs. A vehicle route guidance can no longer occur with current vehicle position data until the vehicle is onroad again, as illustrated in profile 2. From this point on, correct GPS route data for the vehicle route guidance is delivered again. The counter for detecting the route traveled offroad is reset, and the vehicle position calculation function is reactivated.

At the start of the vehicle route guidance, it is monitored on the basis of the pre-calculated vehicle positions whether there is an offroad position information when the vehicle position calculation function is activated, so that the vehicle route guidance can be adopted by the pre-calculated vehicle positions of the calculation function. Further, within the scope of the method, it is monitored whether the onroad position information can be detected, so that the vehicle route guidance can be performed via the GPS route data.

Figure 2:
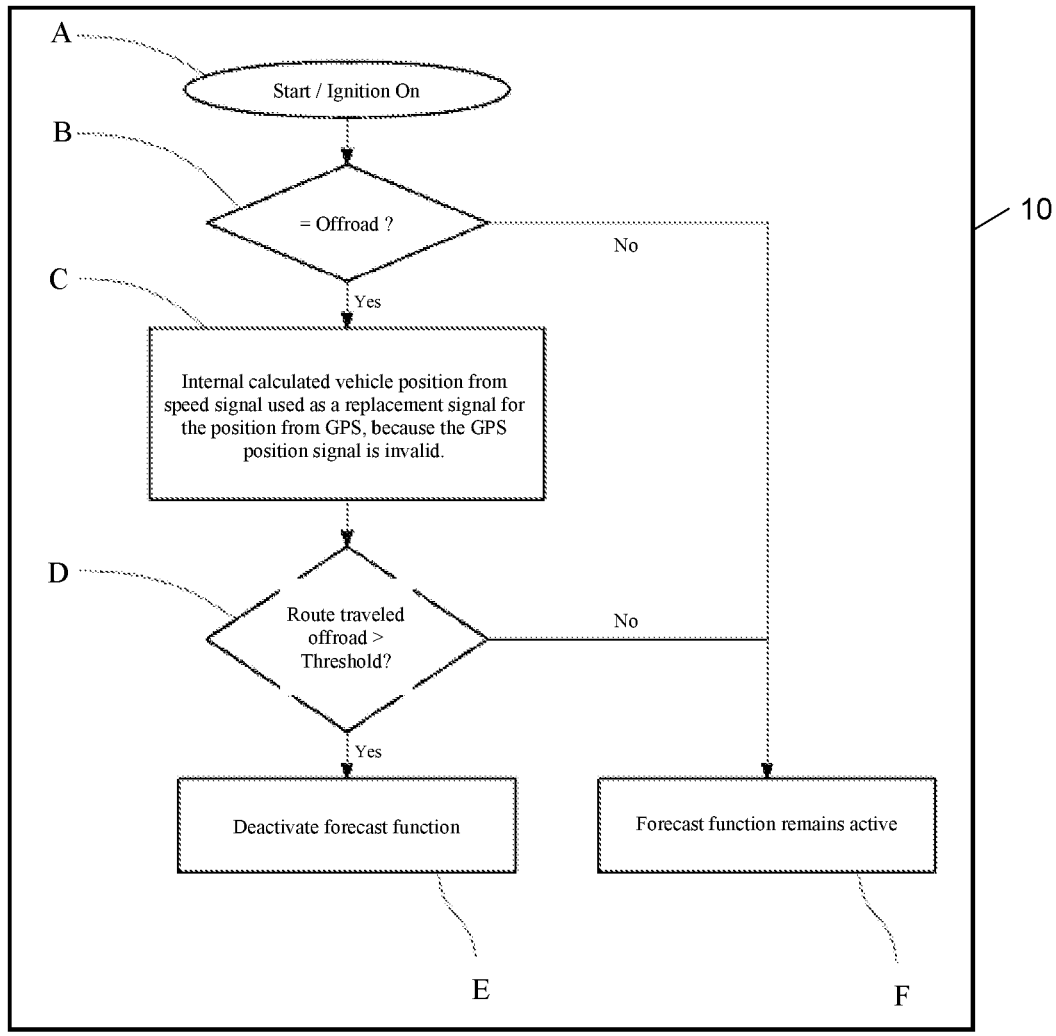
FIG. 2: schematically illustrates a control device and a flow diagram of a possible embodiment of a method according to the invention.

FIG. 2 schematically illustrates a control device 10. Within the control device 10 is an exemplary flow diagram of a possible embodiment of the proposed method according to the invention. In method step A, at the beginning of the method, the start begins by setting the ignition on the vehicle.

In a further process step B, it is checked whether an offroad position information is present. If this is not the case, the vehicle position calculation function or the forecast function remains active, as indicated in method step F. When an offroad position information is present, the vehicle position is determined by the calculation function. Here, the vehicle position from speed signals is used internally as a replacement signal for the position from the GPS route data, because the GPS route or position signal is not valid. This is indicated in method step C.

Furthermore, after the vehicle position has been determined by the calculation function, a counter is started, which detects the route traveled offroad. Thus, in method step D, it is checked whether a predetermined threshold of the offroad route traveled is achieved. If this is not the case, the forecast or calculation function remains active. However, if this is the case, the forecast or calculation function is deactivated in a next method step E.

LIST OF REFERENCE NUMERALS

1 1 Profile of the route
2 Profile of offroad and onroad activations
3 Profile of activation and deactivation of the vehicle position calculation function
4 Profile of the offroad route traveled
5 Threshold
10 control device
A,B,C,D,E,F Method Steps

The invention claimed is:

1. A method for processing GPS route data of a vehicle, the method comprising:
generating, by a GPS system of the vehicle, GPS route data using vehicle positions;
generating, by the GPS system, an offroad position information or an onroad position information based a position of the vehicle with respect to a road;
determining, by the GPS system, that the GPS route data contains one or more erroneous vehicle positions based on a deviation from the onroad position information; and
using, by the GPS system, a vehicle position calculation function for route guidance of the vehicle, wherein the vehicle position calculation function includes pre-calculating vehicle positions using the GPS route data, and wherein the GPS system uses pre-calculated vehicle positions from the GPS route data for vehicle route guidance.

2. The method according to claim 1, wherein pre-calculating vehicle positions is performed at least in part on the basis of speed signals of the vehicle received by the GPS system.

3. The method according to claim 2, comprising replacing the vehicle positions generated from the GPS route data with the pre-calculated vehicle positions.

4. The method according to claim 3, wherein calculating the vehicle positions comprises detecting an offroad route traveled by the vehicle by the vehicle position calculation function.

5. The method according to claim 4, comprising deactivating the vehicle position calculation function when a predetermined threshold (5) of the offroad route traveled is reached, the predetermined threshold including a length of time and/or a distance the vehicle traveled along the offroad route.

6. The method according to claim 5, comprising:
reactivating the vehicle position calculation function; and
resetting a counter of the offroad route traveled when the vehicle position calculation function is reactivated.

7. The method according to claim 6, comprising:
activating the vehicle position calculation function; and
monitoring whether an offroad position information is present on the basis of the pre-calculated vehicle positions, wherein the monitoring begins at a start of the vehicle route guidance.

8. The method according to claim 7, comprising:
detecting an onroad position information; and
using the vehicle positions determined from the GPS route data for vehicle route guidance when the onroad position information is detected.

9. The method according to claim 1, comprising:
detecting an onroad position information; and
using the vehicle positions determined from the GPS route data for vehicle route guidance.

10. A control device for carrying out the method according to claim 1, wherein, upon determining the one or more erroneous vehicle positions, the control device is configured to use vehicle positions from the GPS route data pre-calculated by the vehicle Position calculation function for vehicle route guidance.

11. The control device of claim 10, wherein the control device is configured to pre-calculate vehicle positions for vehicle route guidance on the basis of speed signals of the vehicle.

12. The control device of claim 10, wherein the control device is configured to use pre-calculated vehicle positions as a replacement value for the vehicle positions determined from the GPS route data.

13. The control device of claim 10, wherein during the calculation of vehicle positions, the control device is configured to detect an offroad route traveled by the vehicle by using the vehicle position calculation function.

14. The control device of claim 10, wherein the control device is configured to deactivate the vehicle position calculation function when a predetermined threshold (5) of the offroad route traveled is reached, the predetermined threshold including one or more of a length of time and a distance the vehicle traveled along the offroad route.

15. The control device of claim 10, wherein the control device is configured to reset a counter of the offroad route traveled when the vehicle position calculation function is reactivated.

16. The control device of claim 10, wherein at the start the vehicle route guidance, the control device is configured to monitor, on the basis of the pre-calculated vehicle positions, whether an offroad position information is present when the vehicle position calculation function is activated.

17. The control device of claim 10, wherein the control device is configured to detect onroad position information and use the vehicle positions determined from the GPS route data are used for vehicle route guidance.

* * * * *